United States Patent [19]

Bandera

[11] Patent Number: 4,713,933
[45] Date of Patent: Dec. 22, 1987

[54] HELICOPTER WITH A TURBINE POWER UNIT FITTED WITH AN EXHAUST SCREENING DEVICE

[75] Inventor: Gianluigi Bandera, Gallarate, Italy

[73] Assignee: Costruzioni Aeronautiche Giovanni Agusta S.p.A., Italy

[21] Appl. No.: 867,792

[22] Filed: May 28, 1986

[30] Foreign Application Priority Data

Jun. 7, 1985 [IT] Italy ................. 67530 A/85

[51] Int. Cl.$^4$ .................................. F02C 7/12
[52] U.S. Cl. ........................... 60/39.5; 239/127.3
[58] Field of Search ............ 60/39.5, 262, 264; 239/127.3, 265.17

[56] References Cited

U.S. PATENT DOCUMENTS

| | | | |
|---|---|---|---|
| 3,921,906 | 11/1975 | Nye et al. | 239/265.17 |
| 3,970,252 | 7/1976 | Smale et al. | 239/127.3 |
| 4,004,416 | 1/1977 | Amelio et al. | 60/39.5 |
| 4,007,587 | 2/1977 | Banthin et al. | 60/39.5 |
| 4,044,555 | 8/1977 | McLoughlin et al. | 239/127.3 |
| 4,095,417 | 6/1978 | Banthin | 60/39.5 |
| 4,214,441 | 7/1980 | Mouritsen et al. | 239/265.17 |
| 4,295,332 | 10/1981 | Steyer et al. | 239/127.3 |
| 4,355,507 | 10/1982 | Coffey et al. | 60/39.5 |
| 4,537,026 | 8/1985 | Nightingale | 60/39.5 |

*Primary Examiner*—Louis J. Casaregola
*Attorney, Agent, or Firm*—Kane, Dalsimer, Kane, Sullivan & Kurucz

[57] ABSTRACT

A helicopter with a turbine power unit on which fluid flow from the turbine exhaust nozzle, from a turbine bypass duct, from a duct communicating with the compartment housing the turbine engine, and from one or more ducts for cooling internal parts on the helicopter, converges inside a single manifold the output of which is connected to the input of a tubular screening device extending outwards from the manifold and provided with tubular transverse wing contours communicating externally and arranged in such a manner as to prevent the turbine exhaust nozzle from being directly visible from outside, and in such a manner as to define a number of ejectors for activating the fluid streams converging inside the manifold, and for mixing them together with outside air.

5 Claims, 3 Drawing Figures

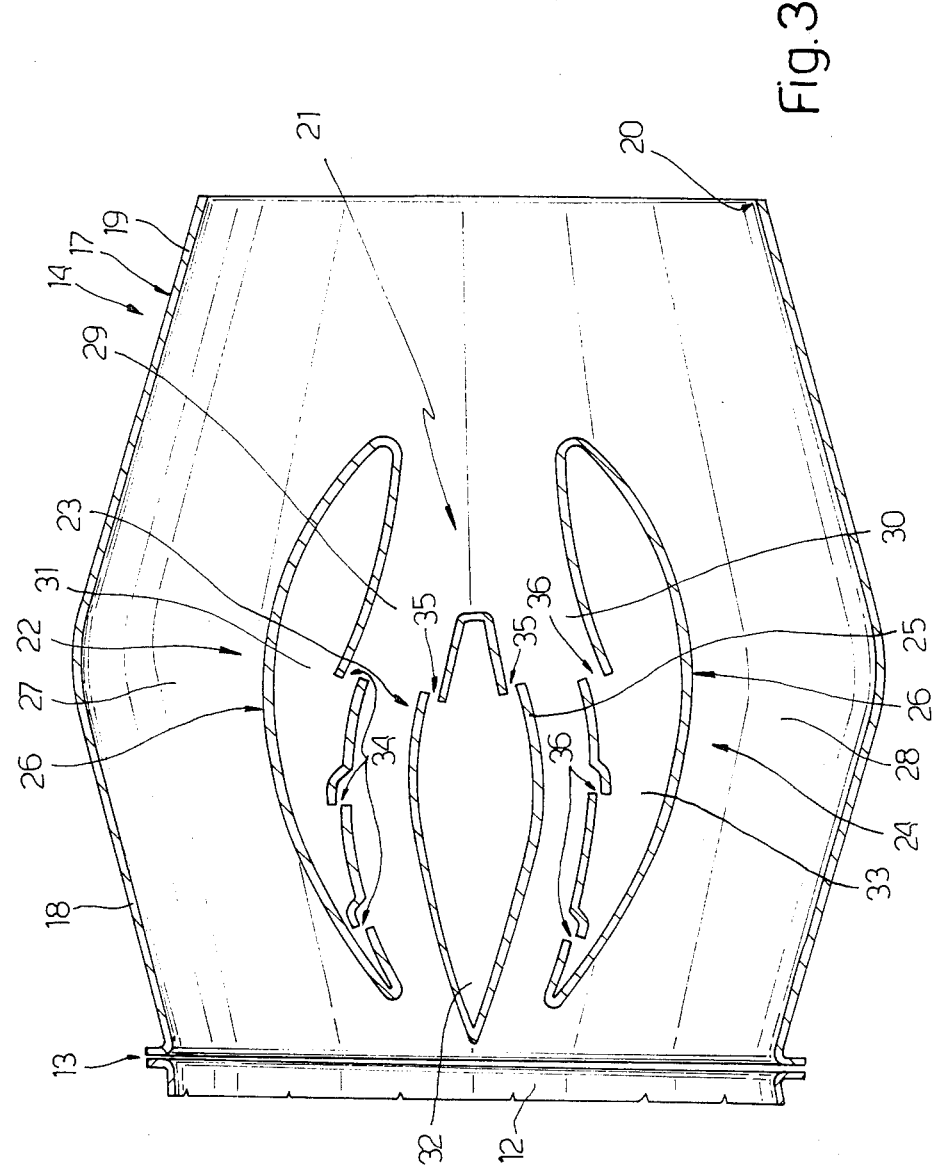

HELICOPTER WITH A TURBINE POWER UNIT FITTED WITH AN EXHAUST SCREENING DEVICE

BACKGROUND OF THE INVENTION

The present invention relates to a helicopter with a turbine power unit fitted with an exhaust screening device. A major design problem on military helicopters is how to minimise heat emission to the outside atmosphere, for eluding enemy missiles with automatic infrared-ray homing systems.

Solving this problem is especially vital when the helicopter rotor is powered by a tubine power unit, the trail of hot exhaust gas from which is a veritable "approach run" for infrared-ray missiles, and the exhaust nozzles of which provide a perfect target.

A first approach towards solving this problem on known military helicopters with turbine power units consisted in extending the turbine exhaust nozzle by means of a tubular screening device having movable or fixed transverse blades arranged in such a manner as to prevent the "eye" of the exhaust nozzle from being directly visible from outside.

Subsequently, attempts were made to lower the temperature of the exhaust gas by mixing it with outside air inside the screening device. This was achieved by fitting the inside of the screening device with tubular transverse blades communicating, at the end, with the outside atmosphere and, centrally, with the inside of the screening device, and by exploiting the vacuum produced by the expanding exhaust gas from the screening device, for drawing cold outside air into the screening device through the blades.

The major drawback of the above known solutions is that the amount of exhaust gas cooling provided for is insufficient for eluding the increasingly sophisticated homing system on modern missiles.

The main reason for the relatively poor performance of known screening devices is that the air stream sucked in from outside through the said tubular blades is insufficient for cooling the temperature of the exhaust gas as required.

Furthermore, known screening devices consist of passive elements which reduce the carrying capacity of the helicopter, firstly, on account of the relatively heavy weight involved and, secondly, by determining exhaust coounterpressures resulting in considerable power loss on the respective power units.

SUMMARY OF THE INVENTION

The aim of the present invention is to provide a helicopter with a turbine power unit, the screening device of which is designed, not only to prevent the turbine nozzle from being directly visible from the outside, and to provide for more efficient cooling of the exhaust gas, but also to perform as an active element for minimising power losses and improving performance of the power unit.

With this aim in view, accoridng to the present invention, there is provided a helicopter comprising a turbine power unit, an exhaust screening device, and at least a first cooling duct for externally conveying air cooling internal parts on the helicopter, the said power unit comprising an egine compartment, a second duct for cooling the said engine compartment, a turbine engine housed inside the said compartment, a dynamic outside-air intake, an engine intake duct and a bypass duct, both connected to the said dynamic intake, and an engine exhaust nozzle; characterised by the fact that it comprises a manifold connected, at one end, to the input on the said screening device and, at the other, to the said nozzle, the said bypass duct and the said cooling ducts; the said screening device comprising a number of ejectors for activating the fluid flowing through the said bypass and cooling ducts.

BRIEF DESCRIPTION OF THE DRAWINGS

One embodiment of the present invention will be described by way of example with reference to the accompanying drawings in which :

FIG. 3 shows a section along line III—III in FIG. 1.

DETAILED DESCRIPTION OF THE INVENTION

Figure 1:
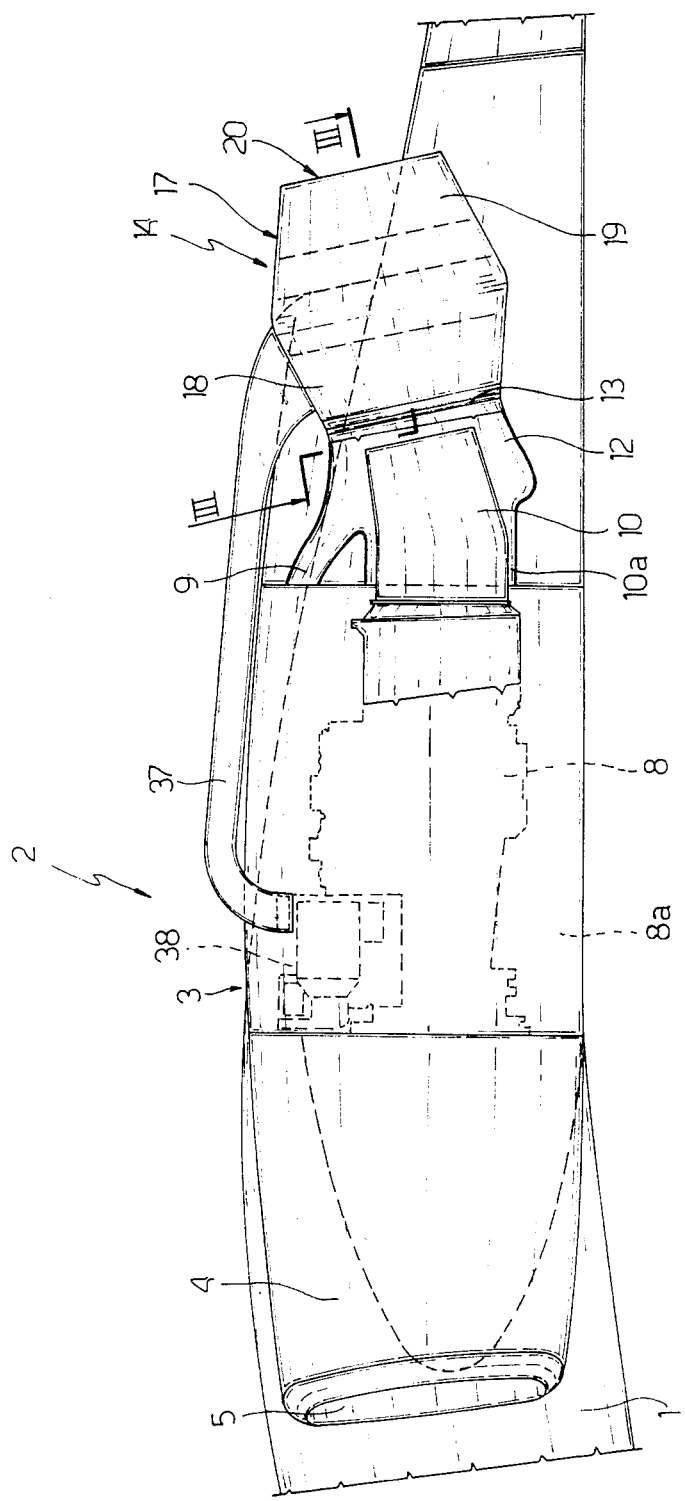
FIG. 1 shows a partial side view of a helicopter according to the teachings of the present invention.
Figure 2:
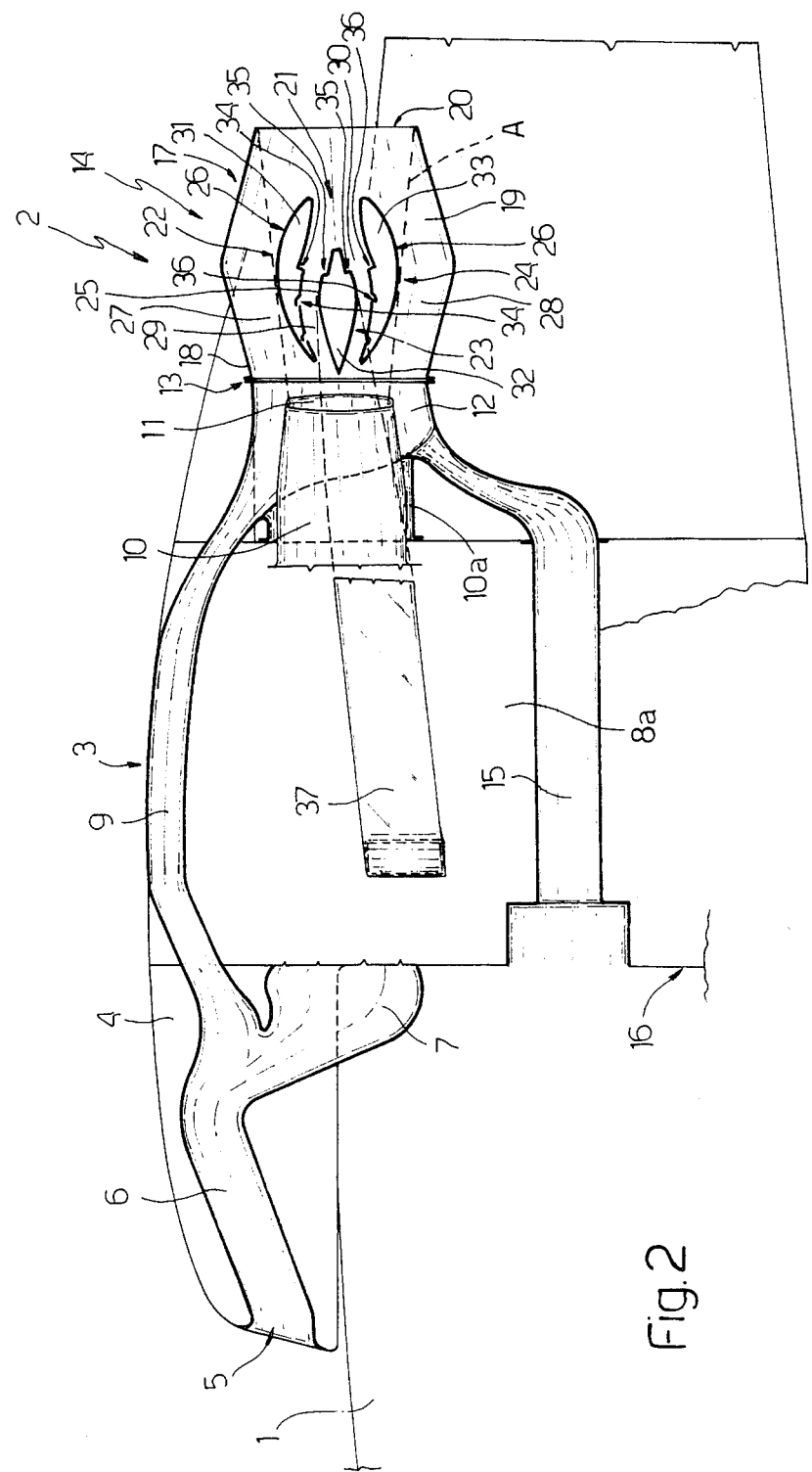
FIG. 2 shows a plan view, with parts sectioned and parts removed for clarity, of the FIG. 1 helicopter.

FIGS. 1 and 2 show the upper portion of the body 1 of a helicopter indicated as a whole by 2 and the rotor (not shown) of which is powered by at least one turbine power unit indicated as a whole by 3.

Power unit 3 comprises an external cowling 4 the front end of which defines a dynamic air intake 5 communicating, as shown in FIG. 2, with an internal duct 6 branching off into two forks so as to form a duct 7, for supplying air to the intake of turbine engine 8 housed in engine compartment 8a, and a bypass duct 9.

The hot combustion gas from turbine engine 8 comes out through nozzle 10 arranged coaxial with duct 10a for cooling engine compartment 8a, and having an outlet 11. Outlet 11 comes out inside a tubular manifold 12 surrounding nozzle 10 from the free end of duct 10a and extending a given way beyond outlet 11 in the travelling direction of the hot exhaust gas. By means of a flange-counterflange connecting assembly 13, the free end of tubular manifold 12 is connected to the end of a screening device indicated as a whole by 14.

In addition to nozzle 10 arranged centrally in relation to manifold 12, the said manifold 12 is also joined by a number of lateral ducts comprising duct 9 and cooling air duct 15 from a compartment 16 housing a drive (not shown) located between turbine engine 8 and the rotor (not shown) on helicopter 2.

Screening device 14 comprises a tubular outer casing 17 coaxial with manifold 12 and comprising two opposed, substantially truncated-cone portions 18 and 19 connected together by their longer ends. The shorter end of portion 18 is connected to the output end of manifold 12 by means of connecting assembly 13, whereas the shorter end of portion 19 defines the outlet 20 of screening device 14.

Any straight line joining any point on the circle defined by outlet 11 on nozzle 10 to any point on the circle defined by outlet 20 on screening device 14, i.e. any straight line extending inside truncated cone A (shown by the dotted line in FIG. 2) the shorter and longer ends of which consist of outlets 11 and 20 respectively, intersects a screen 21 defined by three substantially vertical, tubular crosspieces 22, 23 and 24 extending through and supported by the opposite ends of casing 17.

Crosspiece 23 is located between crosspieces 22 and 24 and presents a cross section in the form of a wing contour 25 with two convex sides. Crosspieces 22 and 24 are arranged on opposite sides of crosspiece 23 and each present a cross section in the form of a concave-convex wing contour 26 with its concave side facing crosspiece 23. Wing contours 25 and 26 are arranged inside casing 17 with their chords substantially parallel with the longitudinal axis of casing 17.

Inside casing 17, crosspieces 22, 23 and 24 define four ejectors 27, 28, 29 and 30, the first two being defined by the convex surfaces of wing contours 26 of crosspieces 22 and 24 and by the inner surface of casing 17, and the second two being defined by the concave surfaces of wing contours 26 of crosspieces 22 and 24 and by the convex surfaces of wing contour 25 of crosspiece 23.

Crosspieces 22, 23 and 24 are tubular and define respective through ducts 31, 32 and 33 communicating, at opposite ends, with the atmosphere surrounding casing 17 and, at intermediate points, with ejectors 29 and 30 via respective lateral openings 34, 35 and 36.

As shown, particularly in FIG. 2, one end of duct 32 is connected to the output end of a cooling air coutlet duct 37 from an exchanger 38 on the lubricating circuit (not shown) of turbine engine 8.

In actual use, the hot gas from outlet 11 on nozzle 10 flows into manifold 12 where it mixes with the air streams from bypass duct 9, duct 10a cooling engine compartment 8a, and duct 15 cooling compartment 16. As the said air streams are of relatively low temperature and, combined, equal the amount of exhaust gas from outlet 11, the temperature of the gas from manifold 12 is almost half that of the exhaust gas from outlet 11.

Inside screening device 14, the gas flow from manifold 12 is separated into four streams which, flowing along ejectors 27, 28, 29 and 30, accelerate in contact with the convex surfaces of wing contours 25 and 26 and produce downstream from screen 21 a vacuum which sucks in cold air from the outside along ducts 31 and 33 and through openings 34 and 36, and relatively warm air along ducts 37 and 32 and through opening 35. The air flowing into screening device 14 through openings 34, 35 and 36 mixes with the gas from manifold 12 in such a manner that the trail formed by the gas from screening device 14 presents a relatively low temperature and does not define an "approach run" easily tracked by a missile with an automatic infrared-ray homing device.

It should be pointed out that, in addition to reducing the temperature of the exhaust gas and concealing outlet 11, screening device 14 is also designed to function as an active element for improving overall performance of the power unit on the helicopter.

Firstly, as shown clearly in FIG. 2, ejectors 27 and 28 are arranged directly facing the outlets of bypass duct 9 and cooling duct 15, thus activating air flow through the said ducts 9 and 15. This provides, on the one hand, for optimum cooling of compartment 16 and, on the other, for speeding up air flow along bypass 9 which may thus provide for highly efficient filtration of any heavy particles suspended in the air flowing through dynamic intake 5. By virtue of the high speed imparted by ejector 27 on the air flowing along ducts 6 and 9, any heavy particles suspended in the air tend to be carried into duct 9, directly in line with duct 6, instead of being blown into turbine engine 8.

Secondly, by virtue of their vertical position, ducts 31 and 33 may exploit the downward-flowing air stream generated by the main rotor on the helicopter, thus guaranteeing an abundant supply of fresh outside air through openings 34 and 36, under all flying conditions.

Finally, ejectors 28, 29, 30 and 31 provide for minimising exhaust counterpressure and, thus, the power loss on turbine engine 8.

I claim:

1. A helicopter comprising a turbine power unit, an exhaust screening device, and at least a first cooling duct for externally conveying air cooling interal parts on the helicopter, the said power unit comprising an engine compartment, a second duct for cooling the said engine compartment, a turbine engine housed inside the said compartment, a dynamic outside-air intake, an engine intake duct and a bypass duct, both connected to the said dynamic intake, and an engine exhaust nozzle; characterized by the fact that it comprises a manifold (12); an input of said manifold (12) being connected to an output of said nozzle (10), said bypass duct (9), and said cooling ducts (10a, 15) to receive therefrom respective fluid flows to form a fluid mixture; an output of said manifold (12) being connected to an input of said screening device (14) to feed the same with said mixture; and said screening device (14) comprising a number of ejectors (27, 28, 39, 30) which are located so as to activate the fluid flows through said bypass and cooling ducts (9, 10a, 15), and through each of which a part of said fluid mixture flows.

2. A helicopter as claimed in claim 1, characterised by the fact that the said screening device (14) comprises a tubular outer casing (17) and a number of crosspieces (22, 23, 24) arranged side by side, extending across the said casing (17) and constituting a screen (21) for the outlet (11) of the said nozzle (10), each said crosspiece presenting a cross section in the form of a wing contour (25, 26) having its chord substantially parallel with the longitudinal axis of the said casing (17); and the said crosspieces (22, 23, 24) defining, together and with the said casing (17), the said ejectors (27, 28, 29, 30).

3. A helicopter as claimed in claim 2, characterised by the fact that the said crosspieces (22, 23, 24) are three in number, are arranged substantially vertically and define, together with the said casing (17), four said ejectors (27, 28, 29, 30) arranged side by side; a first (27) of the said ejectors being arranged facing the output end of the said bypass duct (9), and a second (28) of the said ejectors being arranged facing the output end of the said first cooling duct (15).

4. A helicopter as claimed in claim 3, characterised by the fact that it comprises at least one further cooling duct (37); the said crosspieces (22, 23, 24) being tubular, combining to define a third and fourth (29, 30) of the said ejectors, communicating externally at at least one end, and each having at least one intermediate opening (34, 35, 36) communicating with the said third and fourth ejectors (29, 30); the output end of the said further cooling duct (37) being connected to one end of one of the said crosspieces.

5. A helicopter as claimed in claim 3, characterised by the fact that a third and fourth (29, 30) of the said ejectors are arranged facing the outlet (11) of the said nozzle (10) and the output end of the said second cooling duct (10a).

* * * * *